United States Patent [19]
Maue et al.

[11] Patent Number: 5,953,786
[45] Date of Patent: Sep. 21, 1999

[54] BYPASS LOOP WIPER/WASHER SYSTEM

[75] Inventors: H. Winston Maue, Farmington Hills, Mich.; Robin Mihekun Miller, Ellington, Conn.

[73] Assignee: UT Automotive Dearborn, Inc., Dearborn, Mich.

[21] Appl. No.: 08/948,098

[22] Filed: Oct. 9, 1997

[51] Int. Cl.⁶ .......................................................... A47L 1/00
[52] U.S. Cl. .................. 15/250.01; 15/250.3; 239/284.1; 239/127; 74/665 F
[58] Field of Search ............................ 15/250.02, 250.01, 15/250.14, 250.27, 250.3, 250.31; 239/284.1, 127; 75/665 F

[56] References Cited

U.S. PATENT DOCUMENTS

| | | |
|---|---|---|
| 2,271,207 | 1/1942 | Rhein . |
| 2,345,778 | 4/1944 | Lammeren et al. . |
| 2,615,945 | 10/1952 | Jaeschke . |

(List continued on next page.)

FOREIGN PATENT DOCUMENTS

| | | |
|---|---|---|
| 1281424 | 12/1960 | France . |
| 822 178 | 11/1951 | Germany . |
| 28 16 207 A1 | 10/1979 | Germany . |
| 3807087 A1 | 9/1989 | Germany . |
| 39 23 688 A1 | 1/1991 | Germany . |
| 43 13 363 A1 | 11/1993 | Germany . |
| 43 37 760 A1 | 5/1994 | Germany . |
| 56-22150 | 2/1981 | Japan . |
| 5-86761 | 6/1993 | Japan . |
| 2 153 218 | 8/1985 | United Kingdom . |
| WO 96/33891 | 10/1996 | WIPO . |
| WO 96/33892 | 10/1996 | WIPO . |
| WO 96/99893 | 10/1996 | WIPO . |

OTHER PUBLICATIONS

"Kinematics of Intermittent Mechanism III—The Spherical Geneva Wheel", Product Engineering, Oct. 1949, S. Rappaport, pp. 137–139.

Machine Design, "Mechanical Systems", Jun. 1992, pp. 130, 132, 168.
"Mechanisms and Dynamics of Machinery", Hamilton H. Mabie and Fred W. Ocvirk, John Wiley & Sons, 1957.
A paper from the International Congress & Exposition, SAE Technical Paper Series 960390, "Liftgate Multiplexed Node", Feb. 1996, H. Winston Maue, pp. 73–76.
"Goodheart–Wilcox Automotive Encyclopedia", William K. Toboldt, Larry Johnson, Steven W. Olive, 1989, pp. 723–727.
"Automotive Handbook", Bosch 3rd Edition, 1993, pp. 694–697.
"Kinematic Analysis of Mechanisms", 1959, J.E. Shigley, pp. 228–231.
"Genevamation Indexing Drives", Jan. 12, 1995 Catalog No. 693, Geneva Mechanisms Corporation.
"Saab 900 Owners Workshop Manual", Haynes Publishing Group, 1979 through 1985, pp. 172–174, 237.
Machine Design, "Basics of Design Engineering", Jun. 1992, Article Mechanical Systems.
A paper from the Third Conference on Mechanisms, "A Survey of Intermittent–Motion", F.J. Bogardus, 1956, pp. 8–15.

(List continued on next page.)

*Primary Examiner*—Robert Warden
*Assistant Examiner*—Kaj K. Olsen
*Attorney, Agent, or Firm*—Harness, Dickey & Pierce, P.L.C.

[57] ABSTRACT

In accordance with the present invention, the preferred embodiment of a multi-functional apparatus is integrated with a windshield washer mechanism. An electromagnetic device selectively causes movement of an impeller associated with the windshield wiper mechanism thereby drawing fluid from a reservoir through a bypass loop. When the bypass loop is selectively closed, the fluid is forced through a delivery conduit and is emitted upon the windshield. In another aspect of the present invention, at least a pair of intermittent rotary mechanisms are selectively rotated by a rotatable member coupled to a single reversible electric motor. A bellows-type fluid pump is activated by a driving surface on the rotatable member to force fluid through the window washer mechanism associated therewith.

9 Claims, 3 Drawing Sheets

U.S. PATENT DOCUMENTS

| | | |
|---|---|---|
| 2,659,237 | 11/1953 | Wood . |
| 2,722,617 | 11/1955 | Cluwen et al. . |
| 2,953,802 | 9/1960 | Ziegler .................................. 15/250.02 |
| 2,959,803 | 11/1960 | Ziegler . |
| 3,163,791 | 12/1964 | Carlson . |
| 3,361,005 | 1/1968 | Carpenter . |
| 3,361,947 | 1/1968 | Schlebusch . |
| 3,421,380 | 1/1969 | Mansour . |
| 3,442,146 | 5/1969 | Simpson . |
| 3,443,442 | 5/1969 | Schweihs . |
| 3,443,455 | 5/1969 | Zugel . |
| 3,516,610 | 6/1970 | Stevens ................................ 239/248.1 |
| 3,523,204 | 8/1970 | Rand . |
| 3,574,882 | 4/1971 | Petry . |
| 3,619,676 | 11/1971 | Kawakami . |
| 3,659,128 | 4/1972 | Danek . |
| 3,665,772 | 5/1972 | Beard et al. . |
| 3,688,332 | 9/1972 | Bellware . |
| 3,689,817 | 9/1972 | Elliott . |
| 3,694,723 | 9/1972 | Schneider et al. . |
| 3,705,520 | 12/1972 | Carpenter . |
| 3,803,627 | 4/1974 | Schuscheng . |
| 3,858,922 | 1/1975 | Yamanaka . |
| 3,917,330 | 11/1975 | Quantz . |
| 3,927,436 | 12/1975 | Inoue et al. . |
| 4,009,952 | 3/1977 | Badalich et al. . |
| 4,065,234 | 12/1977 | Yoshiyuki et al. . |
| 4,158,159 | 6/1979 | Orris et al. . |
| 4,173,055 | 11/1979 | Izumi et al. . |
| 4,183,114 | 1/1980 | Eden . |
| 4,259,624 | 3/1981 | Seibicke . |
| 4,271,381 | 6/1981 | Munz et al. . |
| 4,309,646 | 1/1982 | Liedtke et al. . |
| 4,336,482 | 6/1982 | Goertler et al. . |
| 4,352,299 | 10/1982 | Riggs et al. . |
| 4,422,522 | 12/1983 | Slavin et al. . |
| 4,434,678 | 3/1984 | Maus . |
| 4,450,390 | 5/1984 | Andrei-Alexandru et al. . |
| 4,478,004 | 10/1984 | Andrei-Alexandru et al. . |
| 4,492,904 | 1/1985 | Graham . |
| 4,507,711 | 3/1985 | Ono et al. . |
| 4,553,656 | 11/1985 | Lense . |
| 4,573,723 | 3/1986 | Morita et al. . |
| 4,630,178 | 12/1986 | Mugford et al. . |
| 4,639,065 | 1/1987 | Kohler et al. . |
| 4,660,698 | 4/1987 | Miura . |
| 4,674,781 | 6/1987 | Reece et al. . |
| 4,701,972 | 10/1987 | Saito . |
| 4,702,117 | 10/1987 | Tsutsumi et al. . |
| 4,724,760 | 2/1988 | Bubley . |
| 4,733,147 | 3/1988 | Muller et al. . |
| 4,793,640 | 12/1988 | Stewart, Sr. . |
| 4,875,053 | 10/1989 | Harada . |
| 4,878,398 | 11/1989 | Heinrich . |
| 4,885,512 | 12/1989 | Gille et al. . |
| 4,893,039 | 1/1990 | Isii . |
| 4,918,272 | 4/1990 | Nishikawa . |
| 5,007,131 | 4/1991 | Chevalier et al. . |
| 5,023,530 | 6/1991 | Ohashi et al. . |
| 5,045,741 | 9/1991 | Dvorsky . |
| 5,063,317 | 11/1991 | Bruhn . |
| 5,182,957 | 2/1993 | Bohmer et al. . |
| 5,214,440 | 5/1993 | Takahashi et al. . |
| 5,218,255 | 6/1993 | Horiguchi . |
| 5,222,775 | 6/1993 | Kato . |
| 5,228,239 | 7/1993 | Heo . |
| 5,251,114 | 10/1993 | Cantin et al. . |
| 5,274,875 | 1/1994 | Chou . |
| 5,291,109 | 3/1994 | Peter . |
| 5,315,735 | 5/1994 | I-Shin . |
| 5,333,351 | 8/1994 | Sato . |
| 5,355,061 | 10/1994 | Forhan . |
| 5,355,286 | 10/1994 | Flint . |
| 5,373,605 | 12/1994 | Austin . |
| 5,427,345 | 6/1995 | Yamakami et al. . |
| 5,462,337 | 10/1995 | Yamakami . |
| 5,519,258 | 5/1996 | Stroven et al. . |
| 5,528,959 | 6/1996 | Yamakami . |
| 5,691,586 | 11/1997 | Yonnet et al. . |
| 5,694,812 | 12/1997 | Maue et al. . |
| 5,730,028 | 3/1998 | Maue et al. . |
| 5,844,382 | 12/1998 | Dan . |

OTHER PUBLICATIONS

Machine Design, Mechanisms for Intermittent Motion, Dec. 1951, Otto Lichtwitz, pp. 134–148.

"Mechanisms for Providing Intermittent Rotary Motion", Product Engineering, Aug. 1949, pp. 116–117.

Machine Design, "Mechanisms for Intermittent Motion, Part 2", Jan. 1952, Otto Lichtwitz, pp. 127–141.

Machine Design, "Mechanisms for Intermittent Motion, Part 3", Feb. 1952, Otto Lichtwitz, pp. 146–155.

Machine Design, "Mechanisms for Intermittent Motion, Part 4", Mar. 1952, Otto Lichtwitz, pp. 147–155.

A paper from the Third Conference on Mechanisms, "Designing for Intermittent Motion with Modified Starwheels", Karl E. Kist, pp. 16–20.

"Mechanisms for Engineering Design" "Motion, Circular, Intermittent", Chapter 3, S.B. Tuttle, John Wiley Co., pp. 33–51.

Machine Design, "Modifying Starwheel Mechanisms", Vandeman and Wood, Apr. 1953, pp. 255–261.

Patent Abstracts of Japan, vol. 016, 7–438 (M–1309), Sep. 11, 1992 for JP Patent Publication No. 04151351.

page 100, *Machine Design*, 60(1988) Oct.13, No. 24, Cleveland, Ohio, US.

BYPASS LOOP WIPER/WASHER SYSTEM

BACKGROUND OF THE INVENTION

This invention relates generally to windshield wiper/washer systems and specifically to a windshield wiper/washer system operated by a multi-functional apparatus for selectively operating more than one mechanical device coupled thereto.

Almost all automotive vehicles have a single or a pair of windshield wiper assemblies. These assemblies traditionally include rubber wiper blades mounted upon claw brackets. These claw brackets are attached to wiper arms mounted upon rotating shafts. These shafts are either directly driven by electric motors or driven by a single electric motor which actuates series or parallel coupled four-bar linkage mechanism. It is further known to provide a wiper system, in combination with a wash device, to clean the windshields of the automotive vehicle.

It is also common to employ a window wiper assembly for cleaning rear windows of automotive vehicles. Typically, these types of rear window wiper assemblies include a wiper blade mounted upon a bracket which is coupled to a wiper arm. The wiper arm is attached to a wiper shaft rotatably driven in a cyclical oscillating manner by a helical gear. A reversible, fractional horsepower, DC electric motor serves to actuate the helical gear through an armature shaft mounted worm gear enmeshed therewith. This type of rear window wiper arrangement is usually mounted upon a pivoting liftgate of a mini-van, station wagon, sport-utility vehicle, or the like. Examples of conventional window wiper assemblies and motor mechanisms are disclosed within the following U.S. Pat. No. 4,893,039 entitled "Windshield Wiper Motor" which issued to Isii on Jan. 9, 1990; U.S. Pat. No. 4,878,398 entitled "Driving Device for Window Wiper of Motor Vehicles" which issued to Heinrich on Nov. 7, 1989; U.S. Pat. No. 4,336,482 entitled "Rear Window Wiper Motor Control" which issued to Goertler, et al. on Jun. 22, 1982; U.S. Pat. No. 4,259,624 entitled "Arrangement for Wiping a Vehicle Window" which issued to Seibicke on Mar. 31, 1981; U.S. Pat. No. 3,694,723 entitled "Motor Vehicle Windshield Wiper Having a Parking Position Outside the Wiper Area" which issued to Schneider, et al. on Sep. 26, 1972; and U.S. Pat. No. 3,665,772 entitled "Windshield Wiper Motor Link Depressed Park Mechanism" which issued to Beard, et al. on May 30, 1972. All of these patents are incorporated by reference herewithin.

Some conventional vehicles also provide a rear window release lock or latch, actuated by a solenoid, which can be unlocked to allow for upward pivotal movement of the rear window in relation to the otherwise stationary liftgate. In combination therewith, a separate liftgate lock is often mounted upon the liftgate door for fastening the liftgate to the body to prevent inadvertent pivotal opening. This liftgate lock is traditionally operated by manual key or handle rotation, or through a separate electric motor or solenoid. In addition, a separate windshield washer mechanism is commonly mounted within the liftgate door for spraying the rear window of the automotive vehicle with a washer fluid to loosen debris thereon for subsequent wiping by the windshield wiper mechanism.

Furthermore, separate motors and solenoids are required to actuate passenger door locks, antenna retraction mechanisms, headlamp cover retraction mechanisms, fuel filler door locks and other similar functions. The traditional need for such a multiplicity of electromagnetic devices has increased the automotive vehicle weight and cost while further proving difficult to package within the often small spaces provided. This added weight is especially detrimental when the window wiper mechanism, window washer mechanism, rear window lock and liftgate lock, as well as their distinct respective electromagnetic devices, are all incorporated within the pivoting liftgate. Not only is the piece cost increased due to this multiplicity of electromagnetic devices, but the assembly cost, part number proliferation and handling costs, electrical wiring costs, objectional motor noise, and failure modes are increased.

SUMMARY OF THE INVENTION

In accordance with the present invention, the preferred embodiment of a multi-functional apparatus is integrated with a windshield washer mechanism. An electromagnetic device selectively causes movement of an impeller associated with the windshield wiper mechanism thereby drawing fluid from a reservoir through a bypass loop. When the bypass loop is selectively closed, the fluid is forced through a delivery conduit and is emitted upon the windshield. In another aspect of the present invention, at least a pair of intermittent rotary mechanisms are selectively rotated by a helical gear coupled to a single reversible electric motor. A bellows-type fluid pump is activated by a driving surface on the helical gear to force fluid through the window washer mechanism associated therewith.

The multi-functional apparatus of the present invention is advantageous over conventional systems since the present invention combines many different functions into a single apparatus. For example, the present invention multi-functional apparatus replaces the traditional separate rear wiper motor, rear washer mechanism, liftgate lock motor, and rear window lock solenoid. Accordingly, the present invention multi-functional apparatus significantly reduces the piece cost, assembly cost, part proliferation and handling costs, wiring costs, and battery current consumption as compared to conventional constructions. Furthermore, the multi-functional apparatus of the present invention significantly reduces weight and packaging space requirements while increasing the electrical and mechanical reliability of the affected systems. Objectional motor and solenoid noises are also reduced. Moreover, the present invention provides a means for operating a windshield washer mechanism through use of a non-dedicated electric motor. Additional advantages and features of the present invention will become apparent from the following description and appended claims, taken in conjunction with the accompanying drawings.

DETAILED DESCRIPTION OF THE PREFERRED EMBODIMENT

Figure 1:
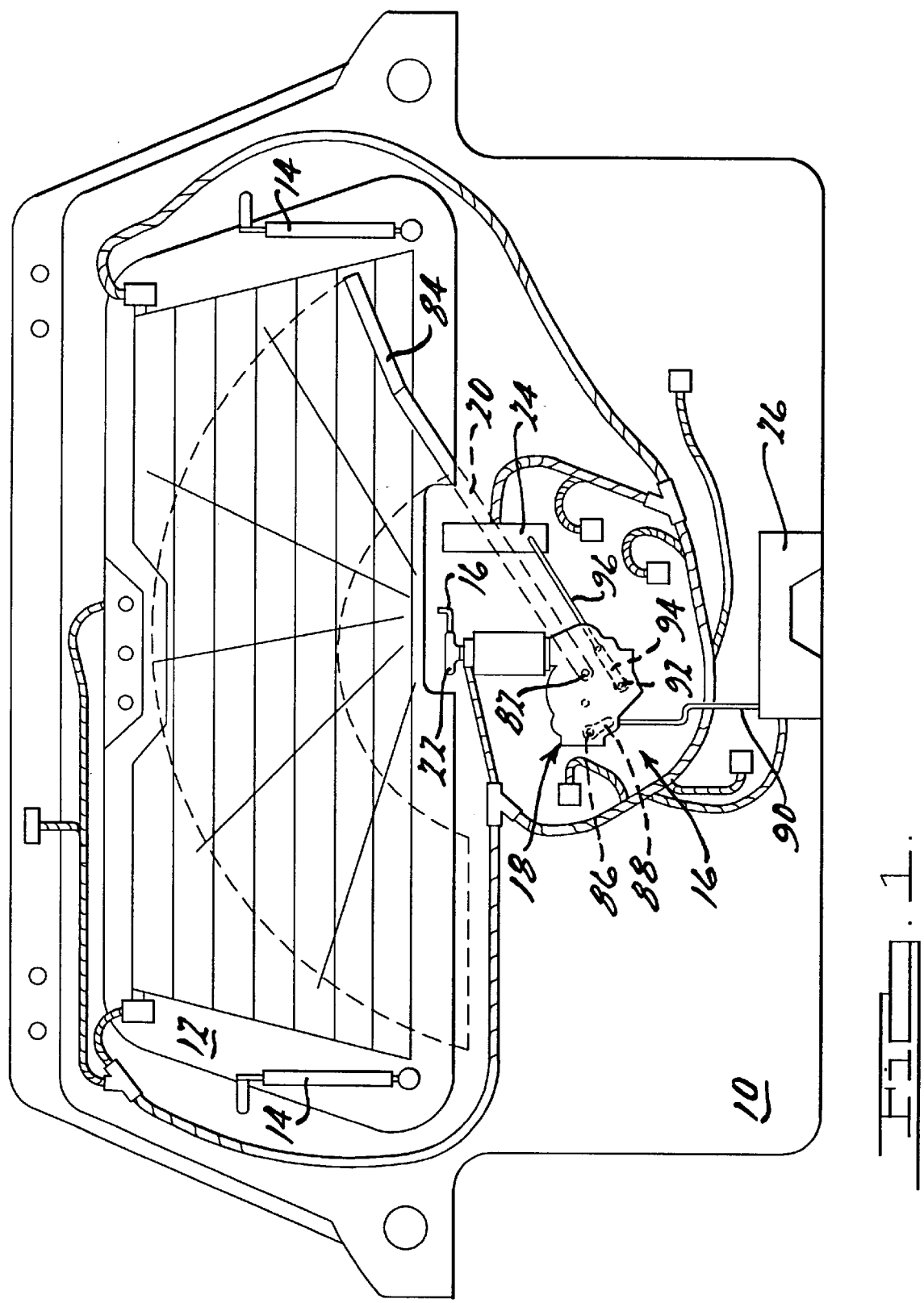
FIG. 1 is a front elevational view showing the preferred embodiment of a multi-functional apparatus of the present invention.

An automotive vehicle, such as a minivan or the like, has a rear liftgate door which can pivot about an upper pair of hinges coupled to the vehicle body structure. When the liftgate is pivoted to an open position, a cargo space is accessible from behind the vehicle. Such a liftgate is shown in FIG. 1. Liftgate 10 has a rear window or backlite 12 pivotable between a closed position, substantially flush with the outer surface of liftgate 10, to an open position about upper hinges. A pair of pneumatic cylinders 14 act to push window 12 toward the open position when a lower portion of window 12 is released. The preferred embodiment of a multi-functional apparatus 16 of the present invention is mounted upon an inner surface of liftgate 10. The majority of apparatus 16 is hidden by an interior trim panel (not shown). Apparatus 16 includes a central drive and power transmission unit 18, a window wiper assembly 20, a window washer assembly 22, a window release latch 24 and a liftgate lock 26, all of which are mounted upon liftgate 10. Examples of such locks (employing separate solenoids or motors, which would be removed in order to couple the lock mechanism for use with the present invention) are disclosed within the following U.S. Pat. No. 5,222,775 entitled "Power Operated Latch Device for Automotive Back Door" which issued to Kato on Jun. 29, 1993; U.S. Pat. No. 4,422,522 entitled "Inertial Lock for Vehicle Door Latch" which issued to Slavin et al. on Dec. 27, 1983; and, U.S. Pat No. 3,917,330 entitled "Electric Lock Release" which issued to Quantz on Nov. 4, 1975; all of which are incorporated by reference herewithin.

Figure 2:
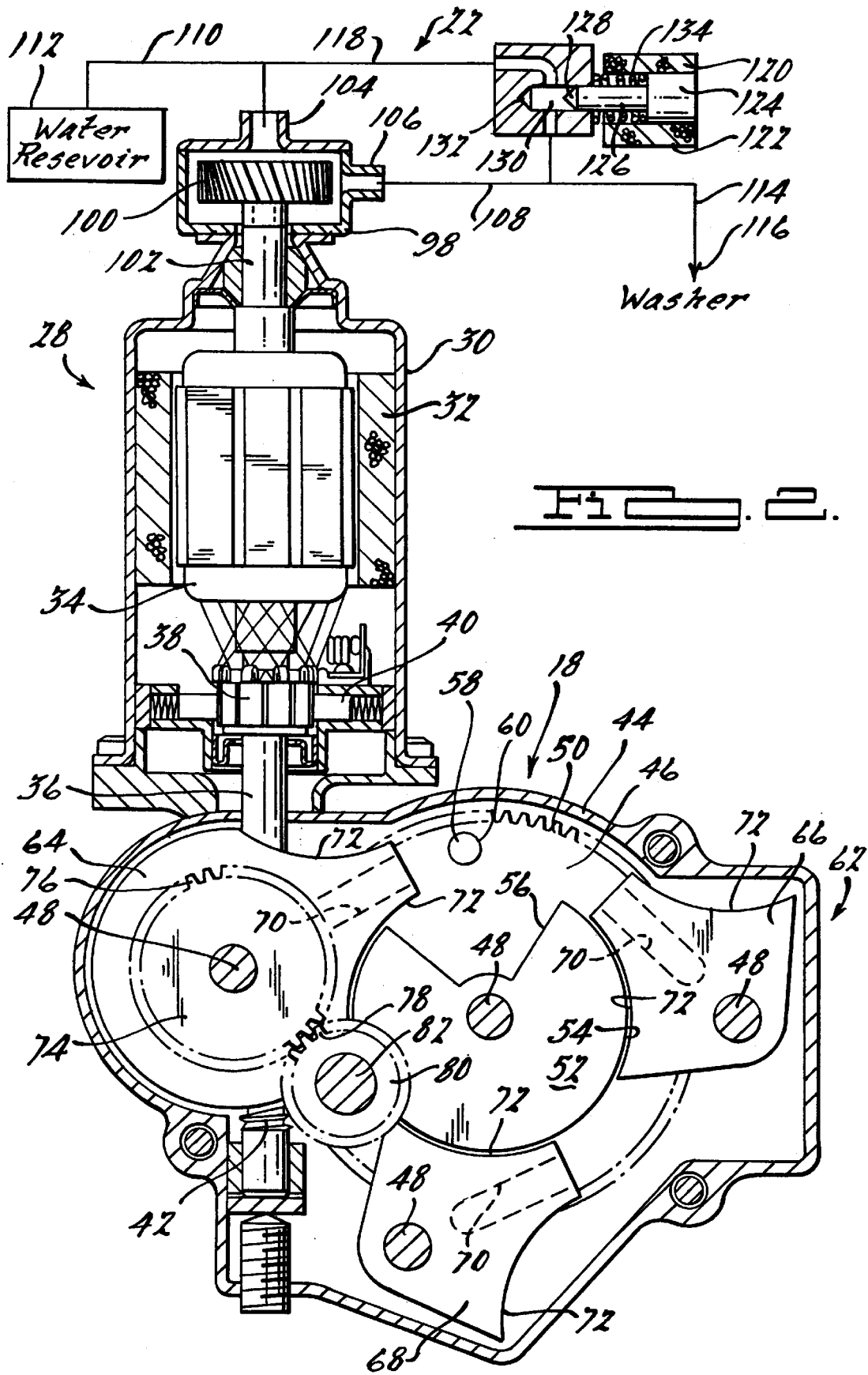
FIG. 2 is a rear elevational view, with portions broken away therefrom, showing the preferred embodiment multi-functional apparatus of the present invention.

The construction of central drive and power transmission unit 18 is best illustrated in FIG. 2. An electric motor 28 is of a conventional 12 volt fractional horsepower, DC electromagnetic variety having a metallic motor housing 30 within which are stationary permanent magnets 32, a rotatable armature 34 with wire windings, a rotatable armature shaft 36 joined to armature 34, a commutator 38 electrically connected to the wire windings and rotatable with armature shaft 36, a brush card assembly 40, and various electronic components, bushings and retainers. It will be appreciated to those skilled in the art that other electric motor constructions can readily be substituted for that shown. A worm gear segment 42 is provided upon a portion of armature shaft 36 extending beyond motor housing 30.

A gear housing 44 is also provided for receiving worm gear segment 42 and the immediately adjacent portions of armature shaft 36. A main helical gear 46 is also housed and rotatably journaled within gear housing 44. Gear housing 44 is preferably made from cast aluminum. A plurality of knurled steel journaling pins 48 are press fit or otherwise attached within machined openings of gear housing 44. The placement of these openings in relation to each other is important. Pins 48 can alternately be molded as part of plastic gears and cams.

Helical gear 46 has an external set of helically oriented teeth 50 projecting entirely therearound for meshing with worm gear segment 42. A drum 52 is mounted upon a face of helical gear 46 for rotating therewith. Drum 52 has a partially circular peripheral surface 54 interrupted by a clearance indentation 56. Drum 52 and helical gear 46 are coaxially aligned for rotation about their respective journaling pin 48. A drive pin 58 projects from a face of helical gear 46 substantially parallel to the adjacent journaling pin 48. Drive pin 58 has a cylindrical driving interface surface 60 thereabout. Of course, a rotatable sleeve may alternately surround drive pin 58. Other alternate driving interface means may be employed such as an integrally molded finger, screw, rivet, spring, rib, plural projections or other similar formations protruding from a face of peripheral portion of helical gear 46. Helical gear 46 is preferably injection molded from a polymeric material such as acetyl. An electrically conductive feedback disk (not shown) is retained to an inside face of helical gear 46 through ultrasonically rolled welding or insert molding. The feedback disk is comprised of a set of copper alloy or brass alloy stamped contacts which are provided with differing conductive and nonconductive patterns depending on the specific positional ranges desired to be moved through by helical gear 46. A more detailed explanation of electricity conductive feedback disk may be found in U.S. Pat. No. 5,841,249 entitled "Multi-Functional Apparatus Employing an Intermittent Motion Mechanism" filed Apr. 28, 1995, in the name of Zimmer et al. which is incorporated by reference herewithin.

A power transmission assembly 62 of central drive and power transmission unit 18 employs three intermittent rotary motion mechanisms or cams 64, 66, and 68. Each cam has a single, linear, external open channel 70 defined by driven interfacing surfaces or walls therein. Driving interface surface 60 of drive pin 58 is selectively engagable against the walls defining channels 70 of each cam. Each cam is rotatable about its respective journaling pin 48. Furthermore, partially circular external surfaces 72 of each cam register with the partially circular peripheral surface 54 of drum 52. A relatively tight tolerance on these registering surfaces of about 1–2 thousandths of an inch is preferably used. Thus, unless each cam is aligned with indentation 56 of drum 52, partially circular peripheral surface 54 of drum 52 will act to prevent rotation of each cam. However, when indentation 56 of drum 52 aligns with an individual cam, concurrently with drive pin 58 engaging within channel 70 of the same cam, continued rotation of helical gear 46 will cause the selectively coupled cam to rotate therewith. Moreover, the selectively coupled cam will have increased rotational acceleration as drive pin 58 moves closer to journaling pin 48 within channel 70. This rotational acceleration, then deceleration, achieves a desirable inertial ramping up and ramping down effect such that potentially harmful inertial stresses and cyclical fatigue within the device coupled thereto are avoided. The diameter of drive pin 58 should match channel 70 width within half a thousandth of an inch.

Cam 64 additionally has a spur gear 74 stacked coaxially thereupon for simultaneous movement therewith. Spur gear 74 has a peripheral set of teeth 76 extending entirely therearound for enmeshing with a mating external set of teeth 78 extending entirely around a driven pinion gear 80. Pinion gear 80 rotates window wiper output shaft 82. The window wiper shaft 82 extends from a rear face of pinion gear 80 for moving in concert therewith. Wiper shaft 82 is attached to pinion gear 80 through rivets, insert molding, knurled press fitting, et cetera. A window wiper arm 84 (FIG. 1) of wiper assembly 20 is mounted upon wiper shaft 82 in a conventional manner. Wiper shaft 82 is preferably made from cold rolled steel. The system is designed to oscillate wiper assembly 20 at forty-five cycles per minute (round trip) but other cycle frequencies can be achieved.

Referring now to both FIG. 1 and FIG. 2, a protuberance 86 projects from a rear face of cam 66 and engages with a lever 88 which, in turn, is attached to a liftgate lock rod 90. Protuberance 86, lever 88 and rod 90 are also considered to be lock couplings or coupling members. Lock connecting rod 90 is joined to liftgate lock 26 for causing the mechanisms therein to move in response to movement of cam 66. Similarly, a protuberance 92 extends from and moves with a rear face of cam 68. A lever 94 is connected to protuberance 92 for moving therewith. A liftgate window release lock connecting rod 96 connects lever 94 to liftgate window release lock 24 for causing window releasing movement thereof in response to selective movement of cam 68. Protuberance 92, lever 94 and connecting rod 96 are also defined as liftgate window release lock couplings or coupling members. Protuberances 86 and 92 are preferably secured to their respective levers 88 and 94 in a keyhole manner. Additional threaded nuts, push nuts, crimpings, cotter pins and washers or the like (not shown) may be employed to retain the levers to their protrusions. The cams, spur gear and pinion gear are preferably made from powdered metallic steel. Alternately, other coupling means may be employed such as cables, belts, chains, gear sets, multiple linkages, jack screws, rack and pinion gear sets or the like.

Referring again primarily to FIG. 2, window washer mechanism 22 includes a metallic impeller housing 98 adjacent and secured to motor housing 30. A rotatable impeller 100 is fixed (i.e., splined) to a rotatable impeller shaft 102 connected to rotatable armature 34. Impeller housing 98 includes an inlet 104 fluidly communicating within outlet 106 through an interior volume thereof. Inlet 104 and outlet 106 are interconnected externally of impeller housing 98 via a conduit system 108. Conduit system 108 includes a feedline 110 interconnecting a washer fluid reservoir 112 and inlet 104. Conduit system 108 also includes a delivery line 114 extending between exit 106 and nozzle 116 (see also FIG. 1). A low pressure bypass loop 118 extends between feedline 10 and delivery line 114 bypassing nozzle 116 and water reservoir 112. Poppet valve 120 is disposed along bypass loop 118.

Poppet valve 120 comprises a pair of permanent magnets 122 surrounding an armature 124 coupled to shaft 126. Shaft 126 terminates at poppet (i.e., valve) 128 which is axially movable within a passage 130 such that poppet 128 may seat against poppet seat 132. Spring 134 normally biases armature 124 to the right in FIG. 2 such that poppet 128 is spaced apart from poppet seat 132 thereby providing an open flow path through bypass loop 118. Upon actuation of magnets 122 by a wire winding (not shown), armature 124 is forced to the left in FIG. 2 overcoming the bias of spring 134 and moving poppet 128 into seating engagement with poppet seat 132. In this closed mode, bypass loop 118 is closed. As such, fluid flow normally flowing through bypass loop 118 due to its relatively low pressure flows through delivery line 114 and through nozzle 116. Upon deactivation of magnets 122, armature 124 is returned to the right in FIG. 2 under the bias of spring 134 thereby removing poppet 128 from poppet seat 132 and opening bypass loop 118. In this open mode, fluid flow travels through bypass loop 118 rather than delivery line 108 due to the reduced pressure in bypass loop 118 as compared to feedline 110.

Figure 3:
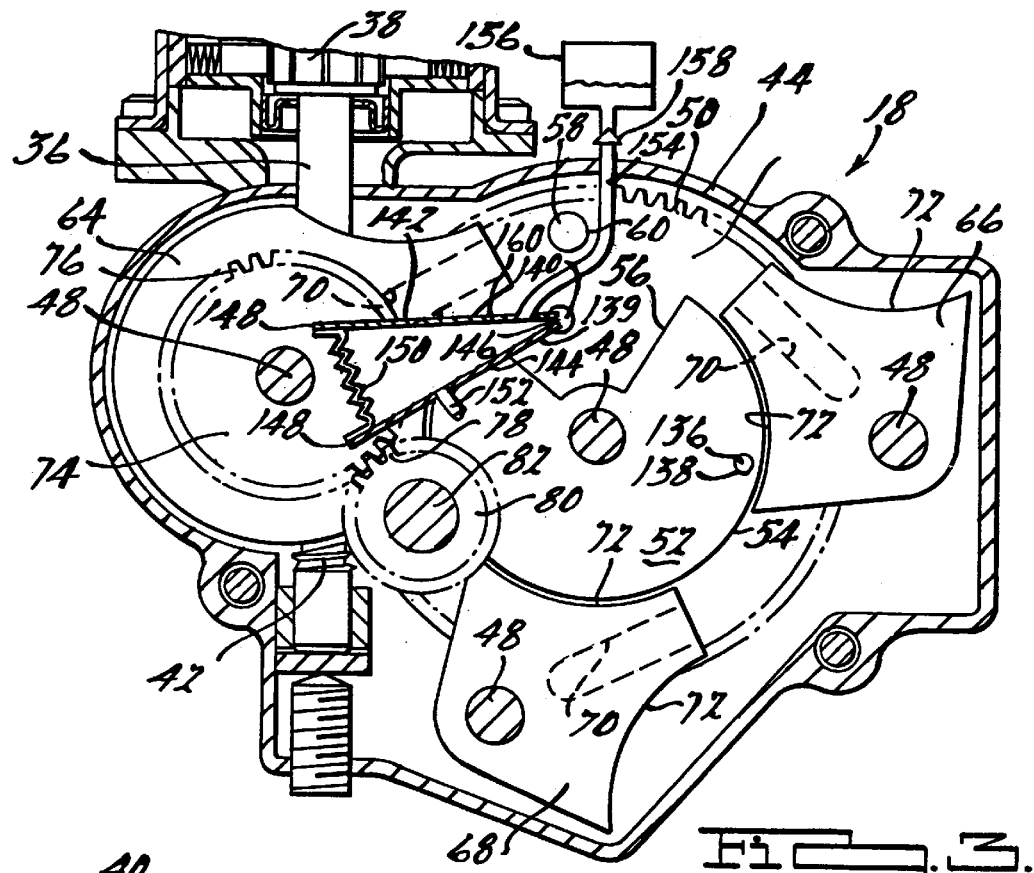
FIG. 3 is a rear elevational view, with portions broken away therefrom, showing the power transmission assembly mechanism of an alternate embodiment multi-functional apparatus of the present invention prior to the beginning of a wash cycle.
Figure 4:
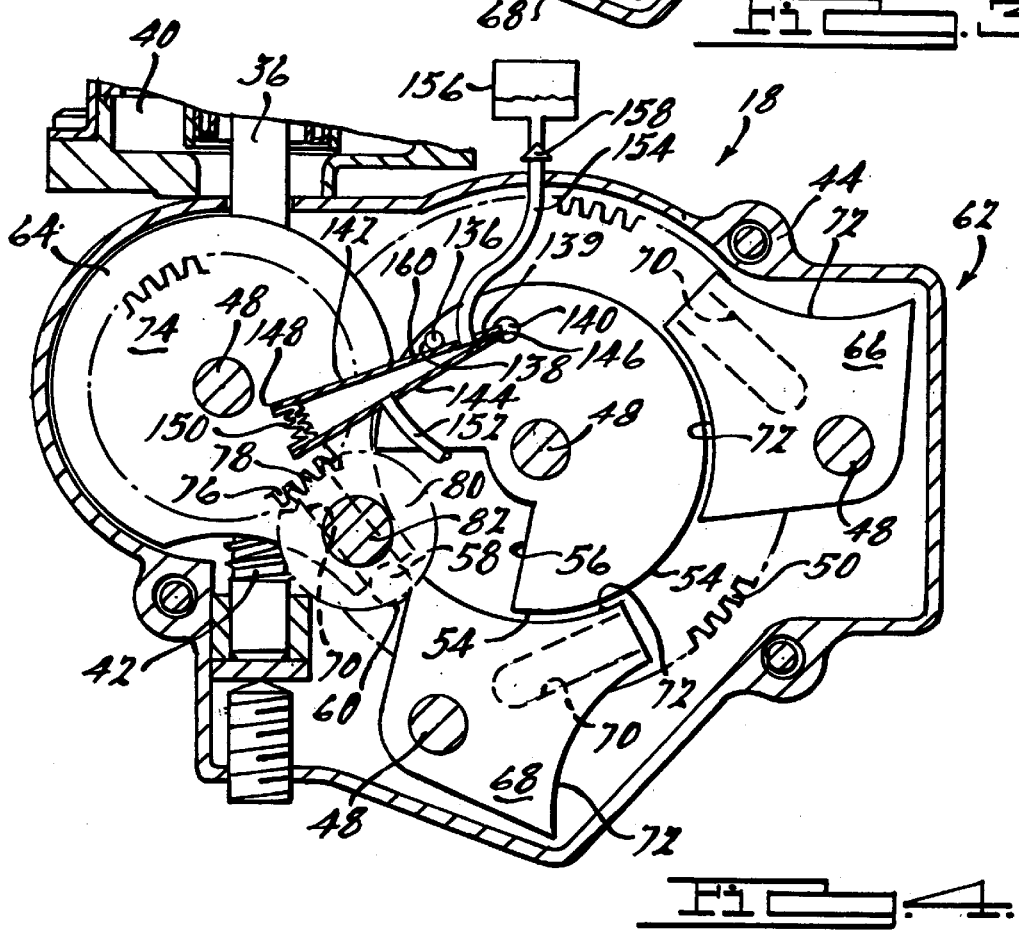
FIG. 4 is a rear elevational view, with portions broken away therefrom, showing the power transmission assembly mechanism of the alternate embodiment multi-functional apparatus of the present invention at the end of a wash cycle.

Referring now to FIGS. 3 and 4, an alternate embodiment of the multi-functional apparatus of the present invention is illustrated. A drive pin 136 projects from a face of drum 52 substantially parallel to the adjacent journaling pin 48. Drive pin 136 has a cylindrical driving interface surface 138 thereabout. Of course, a rotatable sleeve may alternately surround drive pin 136. Other alternate driving interface means may be employed such as an integrally molded finger, screw, rivet, spring, rib, plural projections or other similar formations protruding from a face of peripheral portion of drum 52. A bellows type pump 139 is suspended from a pin 140 press fit or otherwise attach within a machined opening of gear housing 44. Bellows pump 139 is suspended in stacked relation above spur gear 74, cam 64 and drum 52. Bellows pump 139 includes a first wall 142 divergently spaced apart from a second wall 144 from a proximal end 146 adjacent pin 140 to a distal end 148. Distal ends 148 of first and second walls 142 and 144 are interconnected by collapsible end wall 150. Collapsible end wall 150 preferably consists of a strong, flexible material such as kevlar. A conduit 152 interconnects an interior volume of bellows pump 139 with nozzle 116 (see FIG. 1). A second conduit 154 interconnects the interior volume of bellows pump 139 with washer fluid reservoir 156. A check valve 158 is disposed on conduit 154 to prevent back flow of washer fluid from bellows pump 139 to reservoir 156.

In FIG. 3, drive pin 58 has not yet entered channel 70 of cam 64. In this position, the wiper blade remains in its park position (see FIG. 1). As drive pin 58 enters channel 70 of cam 64 due to rotation of helical gear 46, cam 64, spur gear 74 and pinion gear 80 are rotated. Normal wiper mode rotation of helical gear 46 is stopped at the end of the window wipe range. The electrical polarity is then reversed to motor 28 (see FIG. 1) such that rotation of helical gear 46, drive pin 58, cam 64, spur gear 74, pinion gear 80 and wiper shaft 82 are reversed back to the beginning of the window wipe range. This sequence is then repeated to continue wiper motion as desired. FIG. 4 illustrates helical gear 46 and drive pin 58 moved beyond the end of the window wipe range to the end of a window wash range. Initial counterclockwise rotation (as illustrated in FIG. 4) beyond the end of the window wipe range causes drive pin 136 to engage a driving surface 160 of first wall 142 of bellows pump 139. Continued rotation of helical gear 46 causes drive pin 136 to drive first wall 142 towards second wall 144 collapsing collapsible wall 150 and forcing washer fluid therein out of nozzle 116 and onto rear window 12 (see FIG. 1). During emission of washer fluid through nozzle 116, the window wiper 84 remains essentially stationary or overrotates only slightly due to the withdrawal of pin 58 from channel 70 of cam 64 and corresponding cessation of rotation of spur gear 80 and wiper shaft 82. Also, check valve 158 prevents washer fluid from returning through conduit 154 to washer fluid reservoir 156.

Thereafter, motor 28 (see FIG. 2) is reversed to move helical gear 46 in a clockwise direction (as illustrated) to cause drive pin 136 to disengage from first wall 142 of bellows pump 139 and to eventually cause drive pin 58 to disengage from channel 70 of cam 64. If desired, continued clockwise rotation of helical gear 46 causes drive pin 58 to enter slot 70 of cams 66 or 68 to selectively actuate rear window latch mechanism 24 or liftgate lock mechanism 26 (see FIG. 1). One skilled in the art will appreciate that motor 28 is controlled for forward and reverse rotation using an electronic control unit or microprocessor as is known in the relevant art. An example of such an electronic control unit can be found in aforementioned U.S. Pat. No. 5,841,249 entitled "Multi-functional Apparatus Implying an Intermittent Motion Mechanism" by Zimmer et al. which is incorporated by reference herewithin.

While various embodiments of this bypass loop wiper/washer system have been disclosed, it will be appreciated that various modifications may be made without departing from the present invention. For example, a driving surface may be coupled to one of the intermittent motion mechanisms for driving the bellows pump. Additionally, a solenoid, electromagnet or other electromagnetic devices may be used in place of the previously described electric motor. Furthermore, additional spur gears, pinion gears, sector gears, planetary gears, jack screws, sprockets and chains, pulleys and belts, cables or other force transmitting means may be employed to couple between the electromagnetic device, rotatable member, cams or locks. Moreover, a multiple gear transmission, linkage, belt or cable system can alternately couple a wiper assembly to the wiper shaft. It will further be appreciated that a variety of other multiplexed or non-multiplexed, microprocessor or analog circuitry may be used to control the apparatus of the present invention. The cam mechanisms may also be accomplished by employing other known intermittent motion mechanisms such as more conventional Geneva mechanisms, intermittent gearing, escapements, ratchet mechanisms or other known selectively activated volt devices. For example, reference should be made to the following U.S. Patents which are incorporated by reference herewithin: U.S. Pat. No. 5,228,239 entitled "System For Automatically Opening and Closing Doors Of Vehicles" which issued to Heo on Jul. 20, 1993; U.S. Pat. No. 4,352,299 entitled "Intermittent Motion Gear Apparatus" which issued to Riggs et al. on Oct. 5, 1982; U.S. Pat No. 3,443,455 entitled "Intermittent Motion Device" which issued to Zugel on May 13, 1969; U.S. Pat. No. 3,443,442 entitled "Selectively Operable Intermittent Motion Apparatus" which issued to Schweihs on May 13, 1969; U.S. Pat. No. 3,442,146 entitled "Intermittent Rotary Motion" which issued to Simpson on May 6, 1969; and U.S. Pat No. 3,421,380 entitled "Intermittent Motion Apparatus" which issued to Mansour on Jan. 14, 1969. The multi-functional apparatus of the present invention can further be employed for front windshield wipers, side door locks or other automotive vehicle and non-automotive vehicle applications. Moreover, the present invention can operate a backlite wiper in a hatchback or fixed backlite sedan. While various materials, electronic components, circuits and force transmitting members have been disclosed, a variety of other such materials, electronic components, circuits and force transmitting devices may be used. It is intended by the following claims to cover these and any other departures from the disclosed embodiments which fall within the true spirit of this invention.

The invention claimed is:

1. A multi-functional automotive vehicle apparatus comprising:
   an electromagnetic device;
   a rotatable member coupled to a first shaft if said electromagnetic device, said rotatable member having at least one driving interface surface thereon;
   at least one intermittent rotary motion mechanism having a driven interfacing surface thereof engageable with said at least one driving interface surface for changing orientation of said at least one intermittent rotary motion mechanism; and
   a fluid pumping mechanism including a conduit system having an impeller disposed therein operably coupled to a second shaft if said electromagnetic device for selectively pumping a fluid to a desired location.

2. The multi-functional apparatus of claim 1 wherein said conduit system further comprises a bypass loop for accommodating fluid flow driven by said impeller when said fluid pumping mechanism is in a non-fluid delivery mode.

3. The multi-functional apparatus of claim 2 wherein said bypass loop includes a valve member for selectively closing said bypass loop such that said fluid flow is forced through a delivery line for eventual emission.

4. The multi-functional apparatus of claim 3 wherein said valve member further comprises a poppet valve.

5. The multi-functional apparatus of claim 1 wherein said conduit system further comprises:
   a feedline extending between a fluid reservoir and a housing encompassing said impeller;
   a fluid delivery line extending between said housing and a fluid delivery nozzle adjacent an area to be subjected to said fluid; and
   a bypass loop extending between said feedline and said delivery line and having a lower pressure than said delivery line such that fluid preferentially flows through said bypass loop when said bypass loop is in an open mode.

6. The multi-functional apparatus of claim 5 wherein said bypass loop further comprises a valve member for selectively closing said bypass loop such that fluid flow preferentially travels through said delivery line and is emitted adjacent said area to be subjected to said fluid.

7. The multi-functional apparatus of claim 1 wherein said at least one intermittent rotary motion mechanism is further defined as a cam and said driven interfacing surface is further defined as sidewalls of a single, linear, externally open channel disposed within said cam.

8. The multi-functional apparatus of claim 1 further comprising:
   a wiper output shaft;
   a wiper gear coupled to said wiper output shaft for supplying oscillating pivotal movement thereto; and
   said at least one intermittent motion mechanism having external gear teeth extending therefrom for enmeshing with said wiper gear thereby intermittently supplying rotational movement thereto when said at least one driving interface surface is between first and second positions thereof.

9. The multi-functional apparatus of claim 8 further comprising:
   a driving interface means coupled to said rotatable member for actuating said fluid pumping mechanism when said at least one driving interface surface is between said second position and a third position.

* * * * *